(12) United States Patent
Francu et al.

(10) Patent No.: US 12,716,039 B2
(45) Date of Patent: Aug. 25, 2026

(54) METHOD AND INSTALLATION FOR GASIFICATION OF HETEROGENIC MIXTURES OF ORGANIC SUBSTANCES AND COMPOUNDS

(71) Applicants: Vlad Francu, Bucharest (RO); Marius-Andrei Francu, Bucharest (RO); Bogdan-Sabin Francu, Bucharest (RO); Costin-Marian Francu, Bucharest (RO)

(72) Inventors: Bogdan-Sabin Francu, Bucharest (RO); Costin-Marian Francu, Bucharest (RO)

(73) Assignees: Vlad Francu, Bucureti (RO); Marius-Andrei Francu, Bucureti (RO); Bogdan-Sabin Francu, Bucureti (RO); Costin-Marian Francu, Bucureti (RO)

( * ) Notice: Subject to any disclaimer, the term of this patent is extended or adjusted under 35 U.S.C. 154(b) by 851 days.

(21) Appl. No.: 18/246,249

(22) PCT Filed: Apr. 4, 2021

(86) PCT No.: PCT/RO2021/050005
§ 371 (c)(1),
(2) Date: Mar. 22, 2023

(87) PCT Pub. No.: WO2021/235963
PCT Pub. Date: Nov. 25, 2021

(65) Prior Publication Data

US 2024/0010941 A1 Jan. 11, 2024

(30) Foreign Application Priority Data

May 18, 2020 (RO) .............................. a 2020 00266

(51) Int. Cl.
*C10J 3/72* (2006.01)
*B01J 6/00* (2006.01)
(Continued)

(52) U.S. Cl.
CPC ............... *C10J 3/723* (2013.01); *B01J 6/008* (2013.01); *B09B 3/40* (2022.01); *B09B 3/70* (2022.01);
(Continued)

(58) Field of Classification Search
None
See application file for complete search history.

(56) References Cited

U.S. PATENT DOCUMENTS 6,971,594 B1 * 12/2005 Polifka ................ B02C 19/061 241/39
8,764,875 B2 * 7/2014 Huang .................. F27D 3/0033 75/10.39

(Continued)

FOREIGN PATENT DOCUMENTS

CA 2306889 C * 12/2008 ............... C10K 1/04
DE 19747324 A1 4/1999

(Continued)

*Primary Examiner* — John J Figueroa
(74) *Attorney, Agent, or Firm* — Gurr & Brande, PLLC; Robert A. Gurr

(57) ABSTRACT

The present invention relates to a process and an installation for the continuous flow of gasification of heterogeneous mixtures of organic substances and compounds such as biomass waste, forestry, municipal solid and liquid waste, sludge from sewage treatment plants and other similar waste. Presentation Of The Invention: The process according to the invention has the following steps: a) the organic raw material in heterogeneous mixture is introduced into the pyrolysis reactor (2) where it is gradually heated, by forced convection and thermal radiation, to a temperature of
(Continued)

900 . . . 1000° C., being kept in contact with metal surfaces that transport thermal energy through conduction from the exothermic area of the gasification reactor. The metal surfaces are placed in fixed positions, different so that the contact surface changes after 5 . . . 20 cm traversed by the flow of organic raw material, each group of metal slats forming 2 . . . 8 separation planes, b) the results the pyrolysis process, respectively the solid, liquid and gaseous phases, are gravitationally transferred to the gasification reactor (1) where they are mixed with the gasification agent, respectively air/oxygen and steam in two successive enclosures, the first enclosure with vortex flow and the second with laminar flow, each stage having independent control of the process parameters. The installation according to the invention consists of one or more pyrolysis reactors (2) of cylindrical or prismatic shape, fixed in the enclosures (15) of the gasification reactor (1), a nozzle system (18) for the controlled introduction of air/oxygen and a lock system consisting of the valve (3) and the container (4) for slag removal.

8 Claims, 4 Drawing Sheets

(51) Int. Cl.
*B09B 3/40* (2022.01)
*B09B 3/70* (2022.01)
*C01B 3/22* (2006.01)

(52) U.S. Cl.
CPC ........ *C01B 3/22* (2013.01); *C01B 2203/0272* (2013.01); *C01B 2203/0833* (2013.01); *C10J 2200/152* (2013.01); *C10J 2200/39* (2013.01); *C10J 2300/1246* (2013.01)

(56) References Cited

U.S. PATENT DOCUMENTS

2006/0112639 A1* 6/2006 Nick ...................... C10K 1/005 48/198.1
2016/0045841 A1* 2/2016 Kaplan ................. C01B 17/027 429/49

FOREIGN PATENT DOCUMENTS

GB 1599398 A 9/1981
WO 2016075362 A1 5/2016

* cited by examiner

PYROLYSIS AND GASIFICATION REACTOR ASSEMBLY

GASIFIER REACTOR

METHOD AND INSTALLATION FOR GASIFICATION OF HETEROGENIC MIXTURES OF ORGANIC SUBSTANCES AND COMPOUNDS

TECHNICAL FIELD

The present invention relates to a process and an installation for the gasification of heterogeneous mixtures of organic substances and compounds such as biomass waste, forest waste, solid and liquid municipal waste, sludge from sewage treatment plants, etc.

BACKGROUND ART

Gasification is a physical-chemical process of irreversible transformation of solid/liquid/gaseous organic compounds into a synthesis gas containing mainly H2, CO and CO2. The physical phenomenon has been known for over 300 years and industrial applications mainly in the fields of energy and petrochemistry have existed for 150 years.

The specialized literature divides the gasification process into 2 distinct stages:

1. The endothermic stage, called PYROLYSIS
2. The exothermic stage, called GASIFICATION Stage 1, Pyrolysis, is a process of transformation or thermal decomposition of compounds or organic chemicals under conditions of high temperatures and without oxygen/air. This process involves the simultaneous change of the chemical composition and physical phase of the compound, and is irreversible. In principle, at this stage, due to the temperature, most of the carbon-hydrogen bonds are broken. The result is a gaseous phase consisting of hydrogen and volatile compounds of pyrolysis materials, a liquid phase which is a mixture of hydrocarbons and organic radicals generically called "pyrolysis oil" and a solid phase consisting mainly of carbon, mineral residues and metals depending on the composition of the initial material. The breaking of the carbon-hydrogen bond takes place at a fixed temperature depending on the chemical formula of the organic compound and is a physical characteristic of that compound. The temperature range is 200-1250° C., with a high amount of compounds pyrolized in the range 200-600° C.

Step 2, Gasification, consists mainly in the transformation of solid carbon into gas by partial oxidation at temperatures above 850° C., according to the following exothermic reactions:

$$+\frac{1}{2}O_2=CO-123.1 \text{ Kj/Kmol carbon}$$

$$C+O_2=CO_2-398.3 \text{ Kj/Kmol carbon}$$

The 2 stages take place in a common reactor, in which the thermal energy produced in the exothermic oxidation reactions of carbon is largely consumed for the heating of organic materials in phase 1 of pyrolysis. The resulting syngas contains 5-100 mg/$m^3$ organic macromolecules with over 100 different chemical formulas, a mixture generically called "tars".

All current patents, academic studies, experimental plants or industrial gasification plants provide for the introduction of the raw material at ambient temperature into the gasification reactor to create a fixed, mobile or fluidized bed. Through the bed of raw material is passed updraft, downdraft or cross draft, the hot syngas resulting from the exothermic reactions in the gasification area to heat the raw material and bring it to the pyrolysis parameters.

US 006902711 B1 features a process and equipment with industrial application, developed by EBARA Corporation and UBE Industries in Japan. The patent shows a gasification process with a fluidized bed in 2 reactors, the first with temperatures below 800° C. and the second with temperatures above 1,300° C.

US 2010/0037519 A1 presents a downdraft gasification process and installation, with fixed bed. To reduce the phenomenon of "channeling" the rector is provided with a central mixer, which leads to increased energy consumption and complicates operation and maintenance.

From a physical point of view, the concept of the current technique underlines the exchange of heat by convection and radiation between a predominantly diatomic gas (which from a radiation point of view, is a transparent body (i.e. it does not receive or yield heat) and from a convection point of view is an insulating material) and a heterogeneous bed of organic materials which from a conducting and convection point of view are insulating materials with a thermal conductivity coefficient of less than 0, 1 W/m*K.

SUMMARY OF INVENTION

The object of the invention is:

1. Disposal of the bed of organic raw material
2. Changing the heat transfer agent
3. Change of the physical phenomenon used for the transfer of thermal energy from the transport agent to the organic raw material
4. Control of the flow of gasifying agent so that in the first phase to create a vortex flow, and in the second phase to create a laminar flow at low speed. These two gasifier flow methods will facilitate contact between oxygen molecules and solid carbon atoms.

The present invention consists in a gasification process without a pyrolysis/gasification bed which allows the gasification of heterogeneous mixtures of organic materials.

According to FIG. 1, the organic raw material is introduced at ambient temperature into the pyrolysis reactors—position 2—and is gradually heated to 800° C. by a metal thermal bridge with the thermal energy produced in the gasification reactor 1. The results of the pyrolysis, respectively the gaseous, liquid and solid fractions are transferred to the gasification reactor where at temperatures up to 1,100° C., with air or oxygen as gasification agent, the exothermic reactions of transformation of solid carbon into CO and CO2 gaseous components, take place. The solid fraction remaining in the gasification reactor, which contains mainly molecules and mineral elements from the chemical composition of the chains of organic macromolecules, is separated from the gas fraction and eliminated by a sluice system consisting of valve 3 and container 4.

According to the present invention, the process consists of transporting thermal energy from the exothermic gasification zone, position 1, to the endothermic pyrolysis zone, position 2, through the metal thermal bridge formed, according to FIG. 4, from the walls of the gasification reactor, position 16-17 and the metal enclosure 15 in which the pyrolysis reactor, the flange and the outer walls of the pyrolysis reactor are positioned, respectively positions 5-9 of the pyrolysis reactor. From a physical point of view, the heat transfer agent with a thermal conductivity coefficient of 0.02-0.1 W/m*K, respectively syngas, is replaced by a metal thermal bridge with a conductivity coefficient greater than 45 W/m*K, namely 400-1,000 times higher than the common syngas heat transfer and in addition with the ability to transfer heat to the raw material by convection and radiation, not just by convection. This new process will significantly increase the efficiency of heat transfer from the exothermic zone to the endothermic zone without additional energy losses and will increase the efficiency of heat transfer to the mass of organic raw material and eliminate the channeling phenomenon. In addition, the thermal bridge formed by the walls of the pyrolysis and gasification reactors will function as a thermal energy accumulator that will deliver the energy depending on the absorption capacity of the heterogeneous mass of organic materials. In other words, in the current technique, the hot syngas, carrying a quantity of thermal energy, moving towards the outlet of the gasification reactor, passes through the bed of colder organic materials and gives off heat depending on the absorption capacity of the materials encountered during residence.

In the end, the syngas leaves the gasifier with the remaining thermal energy. According to the process described in the present invention, the thermal energy is transported through the metal walls of the reactors to the fixed metal surfaces through which the heat exchange is made to the moving organic raw material. In this way, each piece of organic material, moving through the pyrolysis reactor, absorbs as much energy as its physical properties allow. This new process of transporting thermal energy, as well as the energy storage property of metal walls, allows the simultaneous treatment of organic materials with different physical properties and implicitly with different water content. Consequently, the raw material no longer needs to be dried for homogenization, but can be processed as it is, regardless of the water content. Obviously, materials with a high percentage of water will absorb more energy from the walls and will produce in the gasification reactor an appropriate amount of steam which will correspond in the gasification process with a reduction in the need for steam supplied from outside as a temperature controlling agent, thus reducing the processing costs.

The process described in the present invention realizes the controlled transfer of thermal energy by forced convection and by radiation between the metal walls of the reactors and the organic material in controlled motion. According to experimental studies, when moving an organic solid at low speeds in contact with a hot metal wall, after 10 cm the surface of the organic solid is doped with molecular carbon and the heat flux $\Phi$ tends to zero. Consequently, the process according to the present invention must have a change of the contact surface between the moving organic material at low speeds and the high temperature metal wall, for every 10 cm traveled.

Another important experimental observation is that in order to heat 1 Kg of organic mixture from solid urban waste by 700 C, a thermal energy of 1,600-2,200 Kj/Kg is required, depending on the chemical composition and water content of the raw material. This last condition is used to determine the required contact surface and travel speed, depending on the minimum values of the $\lambda/\alpha$ coefficients of heat transfer by conduction/convection of the organic raw material. The lower the coefficients $\lambda$ and $\alpha$, the total contact surface of the metal-organic material must be increased, keeping the condition that the contact surface must be changed at every 10 cm, on the direction of movement of the organic material.

By changing the thermal energy transport agent and by the absence of the bed of organic material, the gasification process is significantly simplified, which allows an efficient control of the speed of the syngas and implicitly of the residence time for reducing the percentage of residual carbon left in the slag. Although at temperatures above 900 C the oxidation of carbon is instantaneous, in practice, a limit of the contact time between solid carbon and gaseous oxygen has been observed under which the percentage of residual carbon in the slag increases. In other words, although the oxidation is instantaneous, at relatively high speeds between the flow of gasifying agent/syngas and the solid materials in the gasification reactor, unoxidized carbon remains in the slag. This phenomenon occurs if carbon does not meet with oxygen. It is known that the molar volume of carbon is of the order of 0.00000529 $dm^3$/mol and the molar volume of oxygen is of the order of 22.42 $dm^3$/mol which means that the distance between 2 molecules of oxygen is 4,000 times greater than the distance between 2 carbon atoms. Under these conditions, a laminar flow of oxygen requires a very low speed in order to obtain random contact only due to the Brownian movement of the gas.

The gasification plant, according to the present invention shown in FIG. 4, consists of the enclosure 16 where the gasifying agent is mixed by a vortex flow, created by the positioning of the nozzles 18, with the solid carbon to facilitate mixing and contact. The steam is preferable to be introduced together with oxygen, because the water molecules are lighter but larger and the mixture facilitates the vortex flow. From the vortex chamber the non-oxidized solid carbon and mineral materials fall on a rotating grate position 14 where they are in laminar contact with the mixture of syngas and oxygen. This area is the second area of carbon oxidation under low velocity laminar flow conditions.

To simplify the seals in the supply area with pyrolysis raw material, the pyrolysis and gasification process will take place at low pressures in the range −0.5÷2 bar. The gasifying agent can be air or oxygen, accompanied by steam for temperature control by endothermic reactions. Due to the heterogeneous raw material, the process is controlled by process software, which allows real-time adjustment of process parameters depending on the existing parameters.

FIG. 1 shows the cylindrical gasification reactor 1, detailed in drawings 3 and 4, in which 1 or more pyrolysis reactors are mechanically fixed (position 2). Increasing the processing capacity is preferably done by increasing the number of pyrolysis reactors and increasing the size of the gasification reactor. The slag is removed by means of the lock system consisting of valve 3 and container 4.

FIG. 2 shows the pyrolysis reactor which has a cylindrical shape and is provided with a metal flange 10 for connection to the organic feedstock and a metal flange 9 for connection to the corresponding cylindrical enclosure, position 15, provided in the gasification reactor. The present invention does not cover the process and the supply installation. Depending on the parameters of the gasification process, a supply equipment in batches with hydraulic piston or a continuous supply system with pressure screw with variable pitch can be used. In both situations, the feeding equipment will have to allow the control of the speed of movement of the organic raw material at the entrance to the pyrolysis reactor in the range of 10-30 mm/s. By means of flange 9, the thermal bridge with cylindrical enclosure is formed and it transports the thermal energy from the exothermic zone of the gasification reactor, position 1, and its walls, towards the pyrolysis reactor position 2. Through the connecting flanges, the thermal energy is transferred by conduction from the gasification reactor to the pyrolysis reactor. In addition, due to the constructive shape, the cylindrical metal enclosure position 15 with high temperature transmits thermal energy through radiation along its entire length to the pyrolysis reactor position 2 which due to the continuous influx of cold raw material, has a lower temperature.

For maintenance reasons, the pyrolysis reactor consists of 4 or more cylindrical sections assembled threaded, positions 5-8, forming a common body.

Each cylindrical section positions 5-8 contains 2 groups of metal slats 10 cm high arranged so that the organic raw material, in its movement at a speed of maximum 30 mm/s along the axis of the cylinder to come into contact with the metal slats, each time, on other surfaces of the organic material. For optimal heat transfer through the metal thermal bridge, the slats are welded to the cylindrical body, and for corrosion resistance they are made of stainless steel. Due to the fluidization of the movement of the organic material along the pyrolysis reactor, the distance between the slides is dimensioned so that the minimum passage surface is 2-3 times larger than the maximum size at which the raw material was chopped.

Due to the low coefficient of heat transfer by conduction, the pyrolysis process of organic materials can be considered a surface process. Theoretically, in order to reduce the residence time and increase the efficiency of heat transfer in the mass of organic material, the solid raw material should be chopped to dimensions comparable to the molecular dimensions. In practice, chopping solid organic materials to sizes smaller than 2-3 cm is uneconomical. This practical reality leads to the lower limitation of the inside diameter of the pyrolysis reactor. The upper limit of the inner diameter is influenced by the dimensions of the gasification reactor. Under these 2 conditions, the inside diameter of the pyrolysis reactor is limited in the range of 200-500 mm, which leads to a processing capacity of 0.8-2.5 t/h. If a higher processing capacity is required, several pyrolysis reactors can be mounted in one gasifier.

The gasification plant, according to the present invention, has very high flexibility in terms of physical-chemical properties of the raw material and allows the processing of virtually any type of organic waste, including but not limited to, agricultural waste, forest waste, municipal waste and assimilated and sludge from municipal wastewater treatment plants. Given that this installation can process heterogeneous organic materials without gas discharges into the environment, this process can be applied to the processing of contaminated organic materials in the "hazardous" category without process changes. Also, the process can be controlled to obtain the syngas with conditioned composition, starting from an insignificant percentage of CO, which allows to obtain pure technical hydrogen, at different CO/H2 ratios for subsequent applications in energy or petrochemistry.

TECHNICAL PROBLEM

In personal studies and experiments on the gasification of various mixtures of organic materials, we noticed a major deficiency in how to transfer heat between the heat transfer agent and the bed of organic matter in the pyrolysis area. Naturally, the synthesis gas will move in the mass of the bed of organic material through the free spaces left between the pieces of material, without the possibility for the operator to control anything other than the speed of movement. At the limit, we have a "tube" with walls made of organic material with a coefficient of heat transfer by conduction <0.1 W/m*K through which a predominantly diatomic gas moves, with a temperature higher than the tube walls. From the point of view of transfer through radiation, the diatomic gas is a transparent body, so it does not receive or yield heat. By convection, the gas will transfer thermal energy to the wall, energy that will accumulate in the surface due to the low conduction coefficient of the walls of organic material. Thus the organic molecules in the surface will reach the critical temperature of breaking the carbon-hydrogen bond, the hydrogen will be entrained in the gas flow, and the carbon will accumulate in the surface making it even more difficult to transfer heat to the mass of material. These undesirable "channeling" phenomena are eliminated in fluidized bed gasification processes, but the efficiency of heat transfer is much lower than in fixed bed processes due to the high gas velocities imposed by the levitation condition of the fluidized bed. The new "bubbling fluidized bed" processes improve heat transfer by convection and bring a small radiation transfer component, but increase energy consumption and greatly complicate the process by introducing and recovering large amounts of quartz sand in the mass of material organic as a fluidizing agent.

SOLUTION TO PROBLEM

The technical problems solved by the present invention are:

1. The phenomenon of "channeling" in the bed of organic raw materials
2. Low efficiency of heat transport from the exothermic zone to the endothermic zone by using syngas as a transport agent
3. Low efficiency of heat transfer from the transport agent to the mass of organic raw material
4. Low efficiency of transformation of solid carbon into CO and CO2 gases and implicitly, a high percentage of residual carbon in slag

ADVANTAGEOUS EFFECTS OF INVENTION

The present invention has the following advantages over the prior art:

1. Disposal of the bed of organic raw material
2. Elimination of channeling phenomena due to the elimination of the raw material bed
3. Increasing the efficiency of transport of thermal energy from the exothermic zone to the endothermic zone
4. Changing the heat transfer agent
5. Thermal energy is transported through the metal walls of the reactors to the fixed metal surfaces through which the heat is exchanged to the moving organic raw material.
6. Controlled transfer of thermal energy by forced convection and radiation between the metal walls of reactors and controlled moving organic material
7. The organic raw material is moving inside the pyrolysis 2 so that the contact surface changes after every 5-20 cm traveled inside the pyrolysis reactor
8. Increasing the efficiency of transformation of solid carbon into CO and CO2 gases with the consequence of reducing residual carbon in slag
9. Controlling the flow of gasifying agent so that in the first phase to create a vortex flow, and in the second phase to create a low velocity laminar flow. These two ways of gasifier agent flow will facilitate the contact between the gas molecules and the solid carbon atoms.
10. The raw material processed in the gasification reactor is no longer organic material but the solid, liquid and gaseous matter resulting from the pyrolysis reactor
11. In the central part of the gasifier is observed the vortex chamber position 16 where the gasifying agent (air or oxygen) and steam are introduced by means of a nozzle system position 18 which creates an upward vortex current. The steam supply passes through the wall of the vortex chamber for overheating depending on the working regime of the gasifier. In this way, the wall of the vortex chamber also takes over the function of a steam generator with variable capacity, adapted to the necessary steam depending on the chemical composition of the raw material.

BRIEF DESCRIPTION OF DRAWINGS

Below is a practical example of installation for the application of the process described in connection with drawings 1-4 which represent:

FIG. 1 Pyrolysis and Gasification Reactor Assembly

FIG. 2 Pyrolysis Reactor

FIG. 3 Gasifier Reactor

FIG. 4 Central Part of the Gasifier Reactor

EXAMPLES

The pyrolysis reactor shown in drawing 2 is a reactor with an inside diameter of 240 mm that can process 0.8-1 tons/hour of municipal solid waste from non-hazardous and hazardous categories regardless of the percentage of water contained. The reactor contains 8 sets of metal slats with a height of 10 cm welded to the outer cylindrical wall to take over the thermal energy by conduction and achieve thermal transfer by convection to the organic raw material. The total contact area of the 8 sets of blades amounts to 1.6 $m^2$. Between the sets of slats is a distance of 4 cm for the resettlement and homogenization of the flow of organic material. In our own experiments we tested speeds of movement of organic materials from 10 to 30 mm/s. A relatively uniform temperature distribution was obtained on the contact slats, from 100 C at the inlet to the reactor at 800 C on the last set of slats, a phenomenon that can be explained due to the supply and distribution system of thermal energy and energy absorbed by matter. organic premium introduced in the process.

Figure 1:
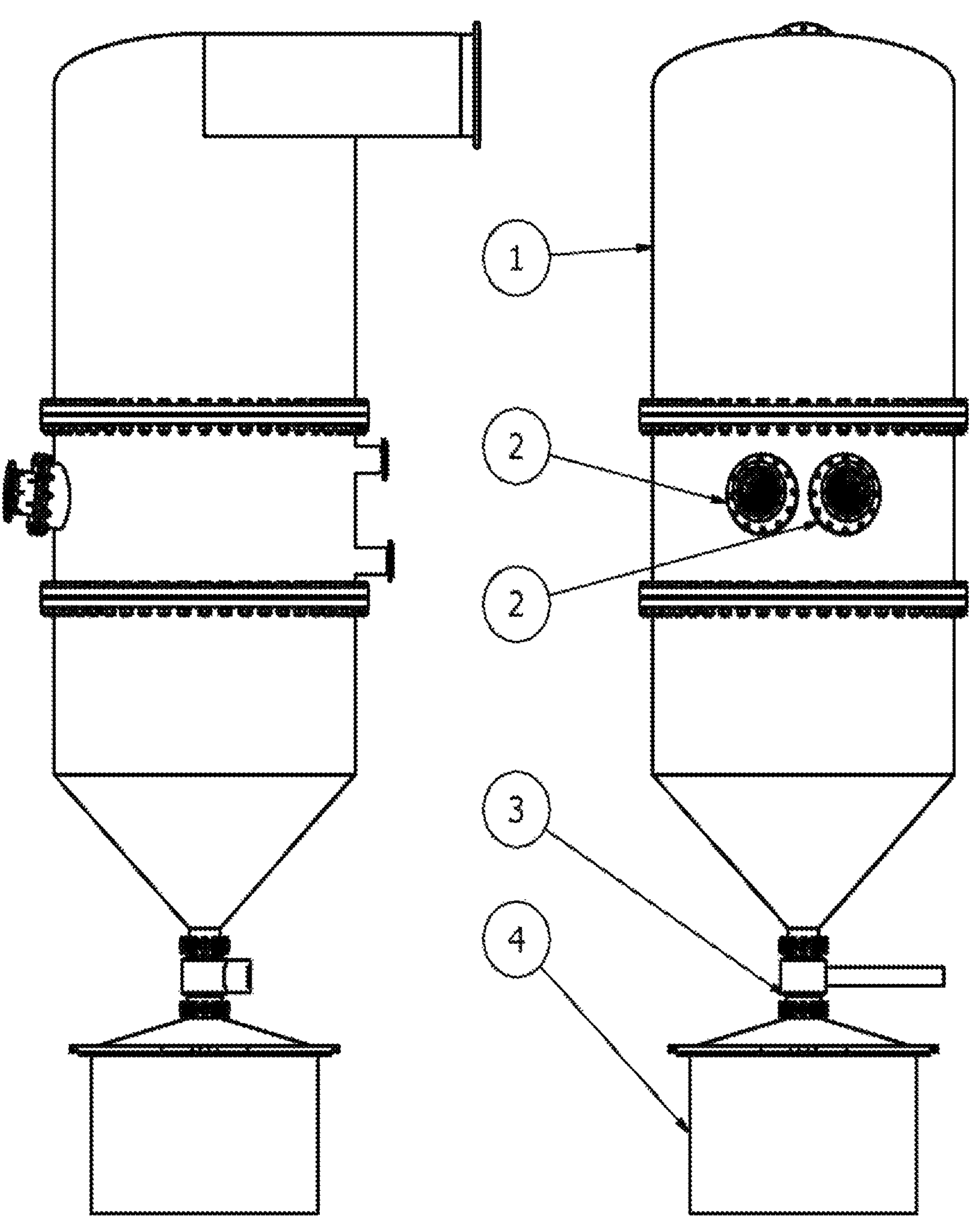
FIG. 1
Figure 2:
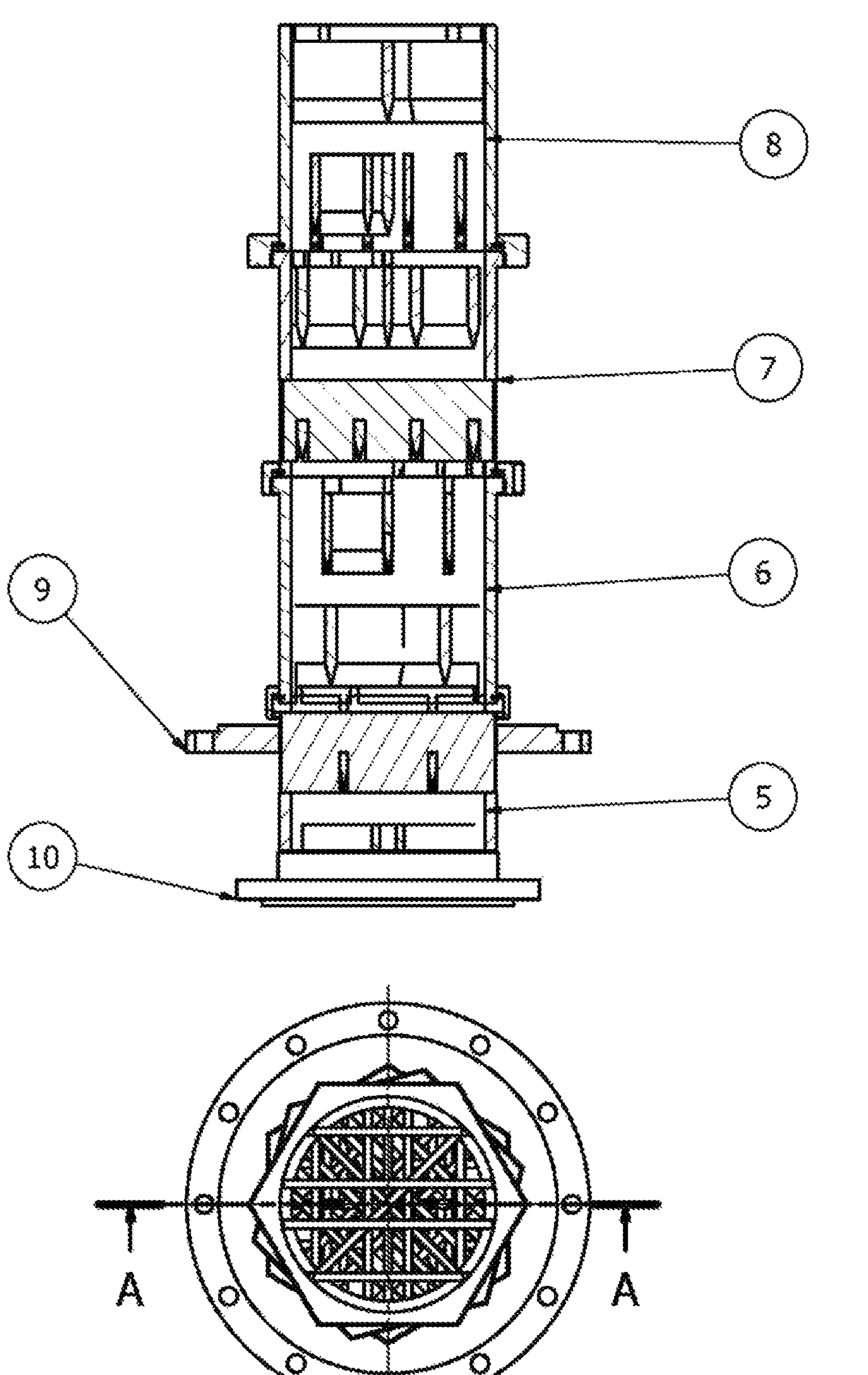
FIG. 2
Figure 3:
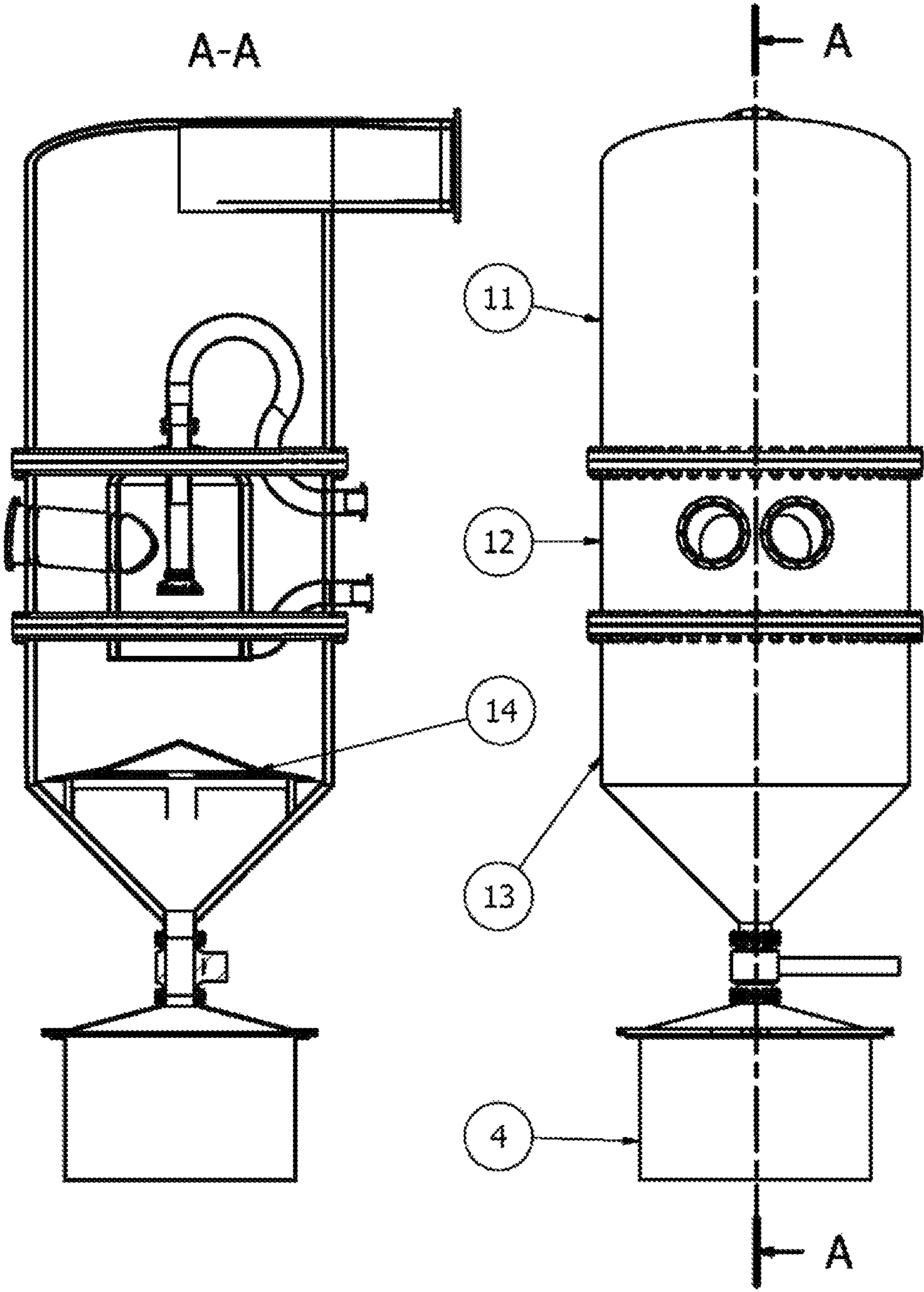
FIG. 3
Figure 4:
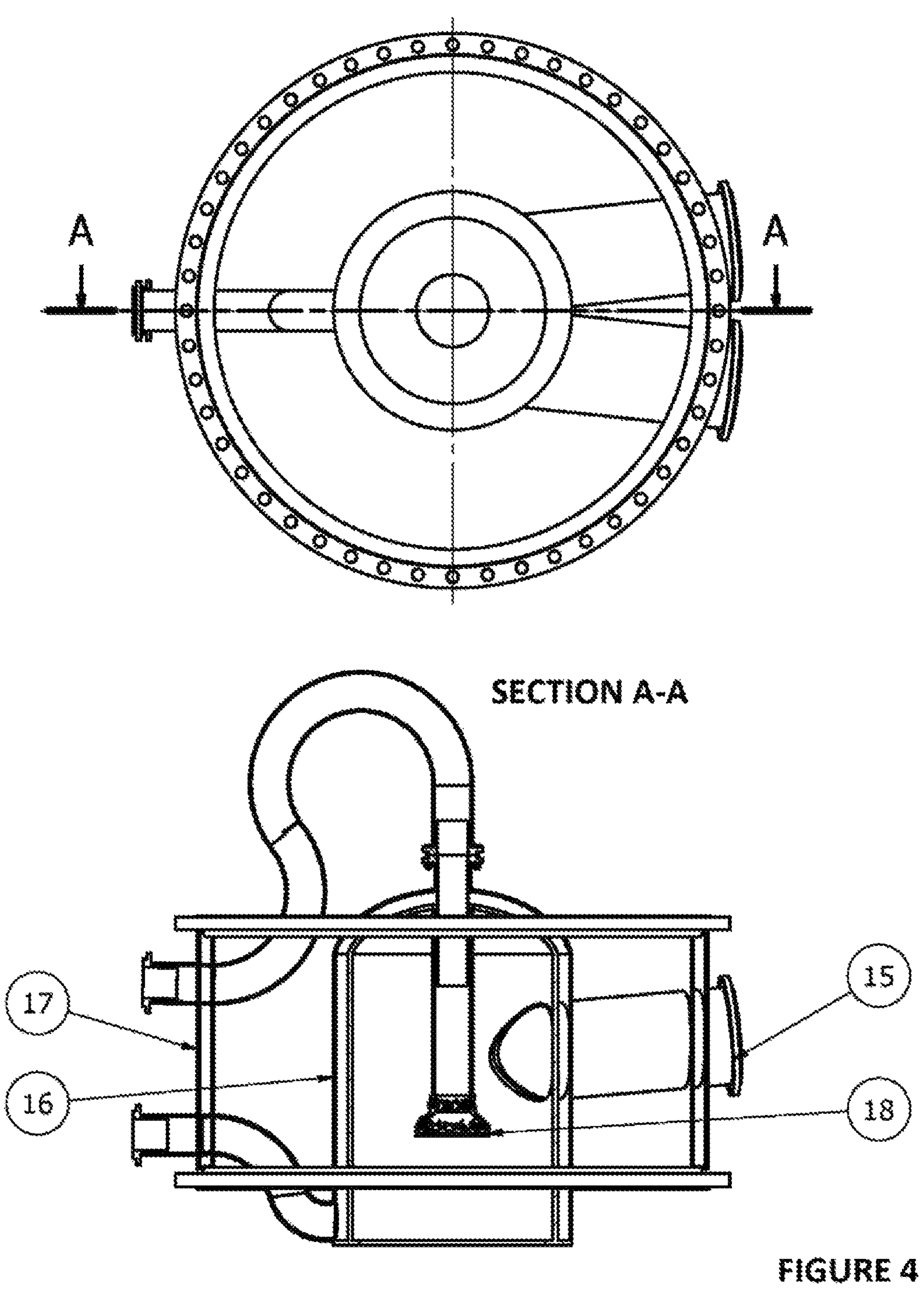
FIG. 4

The gasification reactor 1 has an original shape, adapted to the process and the new functional conditions, presented in FIG. 3, composed of the upper part 11, the central part 12 and the lower part 13, with details of the central part presented in FIG. 4.

The rest of the gasifier, the grate 14 (fixed or mobile), the slag evacuation and the syngas evacuation are common elements according to the known techniques. The complete gasification reactor is made with double jacket for cooling with water/steam, made of stainless steel without internal thermal insulation. Outside, the reactor is covered with thermal insulation made of mineral wool to reduce the loss of thermal energy outside.

This gasification reactor with an inner diameter of 2 m, equipped with 2 pyrolysis reactors with an inner diameter of 240 mm, has a processing capacity of about 2 tons per hour mixture of organic materials from non-hazardous and/or hazardous categories, with water content up to 50% mass percentage. Depending on the end use of the synthesis gas, for the production of electricity, liquid fuels, fertilizers or hydrogen, the amount of air and steam can be controlled to obtain an H2/CO ratio between 0.9 and 100. The minimum oxidation efficiency of carbon is of 90%.

What is claimed is:

1. A process for the treatment of heterogeneous mixtures of solid and liquid organic substances and compounds by gasification, characterized in that it has the following steps:

for a pyrolysis process, an organic raw material in heterogeneous mixture is gradually heated to 900-1000 C by convection and thermal radiation, being kept in contact with fixed metal surfaces that transport thermal energy by conduction from an exothermic zone of a gasification reactor;

for a gasification process, the results of the pyrolysis process, a solid, a liquid and a gaseous phase, are gravitationally transferred to the gasification reactor where they are mixed with a gasification agent, comprising one or more of air, oxygen, and steam, which are introduced in a vortex flow to facilitate contact between solid and liquid phases and gas;

wherein each stage has independent control of the process parameters depending on the state parameters of an input mixture;

wherein there is no bed of organic raw material in the process flow; and the two stages of the process are in continuous flow, without intermediate stages of accumulation.

2. The process according to claim 1, characterized in that the transport of thermal energy from the exothermic zone to an endothermic zone is carried out by a metal thermal bridge.

3. The process according to claim 1, characterized in that in an endothermic zone the exchange of thermal energy is carried out by forced convection and radiation between fixed metal walls and a flow of organic materials in a heterogeneous mixture.

4. The process according to claim 1, characterized in that the heat-transferring metal surfaces are placed in the flow of organic materials in different fixed positions so that the contact surface changes after every 5-20 cm inside the pyrolysis reactor.

5. The process according to claim 1, characterized in that each group of metal slats inside the pyrolysis reactor forms 2-8 separation planes in the flow of organic raw material, separation planes different from the separation planes of adjacent blade groups.

6. The process according to claim 1, characterized in that in the gasification step, the oxidation of carbon takes place in 2 different enclosures, in a cascade, the first enclosure with turbulent flow and the second with laminar flow.

7. A process for the treatment of heterogeneous mixtures of solid and liquid organic substances and compounds by gasification, characterized in that it has the following steps:

for a pyrolysis process, an organic raw material in heterogeneous mixture is gradually heated to 900-1000 C by convection and thermal radiation, being kept in contact with fixed metal surfaces that transport thermal energy by conduction from an exothermic zone of a gasification reactor;

for a gasification process, the results of the pyrolysis process, a solid, a liquid and a gaseous phase, are gravitationally transferred to the gasification reactor where they are mixed with a gasification agent comprising one or more of air, oxygen, and steam, which are introduced in a vortex flow to facilitate contact between solid and liquid phases and gas;

wherein each stage has independent control of the process parameters depending on the state parameters of an input mixture;

wherein there is no bed of organic raw material in the process flow; and the two stages of the process are in continuous flow, without intermediate stages of accumulation; and wherein the heat-transferring metal surfaces are placed in the flow of organic materials in different fixed positions so that the contact surface changes after every 5-20 cm inside the pyrolysis reactor.

8. A process for the treatment of heterogeneous mixtures of solid and liquid organic substances and compounds by gasification, characterized in that it has the following steps:

for a pyrolysis process, an organic raw material in heterogeneous mixture is gradually heated to 900-1000 C by convection and thermal radiation, being kept in contact with fixed metal surfaces that transport thermal energy by conduction from an exothermic zone of a gasification reactor;

for a gasification process, the results of the pyrolysis process, a solid, a liquid and a gaseous phase, are gravitationally transferred to the gasification reactor where they are mixed with a gasification agent comprising one or more of air, oxygen, and steam, which are introduced in a vortex flow to facilitate contact between solid and liquid phases and gas;

wherein each stage has independent control of the process parameters depending on the state parameters of an input mixture;

wherein there is no bed of organic raw material in the process flow; and the two stages of the process are in continuous flow, without intermediate stages of accumulation; and wherein each group of metal slats inside the pyrolysis reactor forms 2-8 separation planes in the flow of organic raw material, separation planes different from the separation planes of adjacent blade groups.

* * * * *